April 19, 1966 D. E. CLARK 3,246,525
SENSING ASSEMBLY FOR LINEAR SERVO ACCELEROMETER
Original Filed July 3, 1961 2 Sheets-Sheet 1
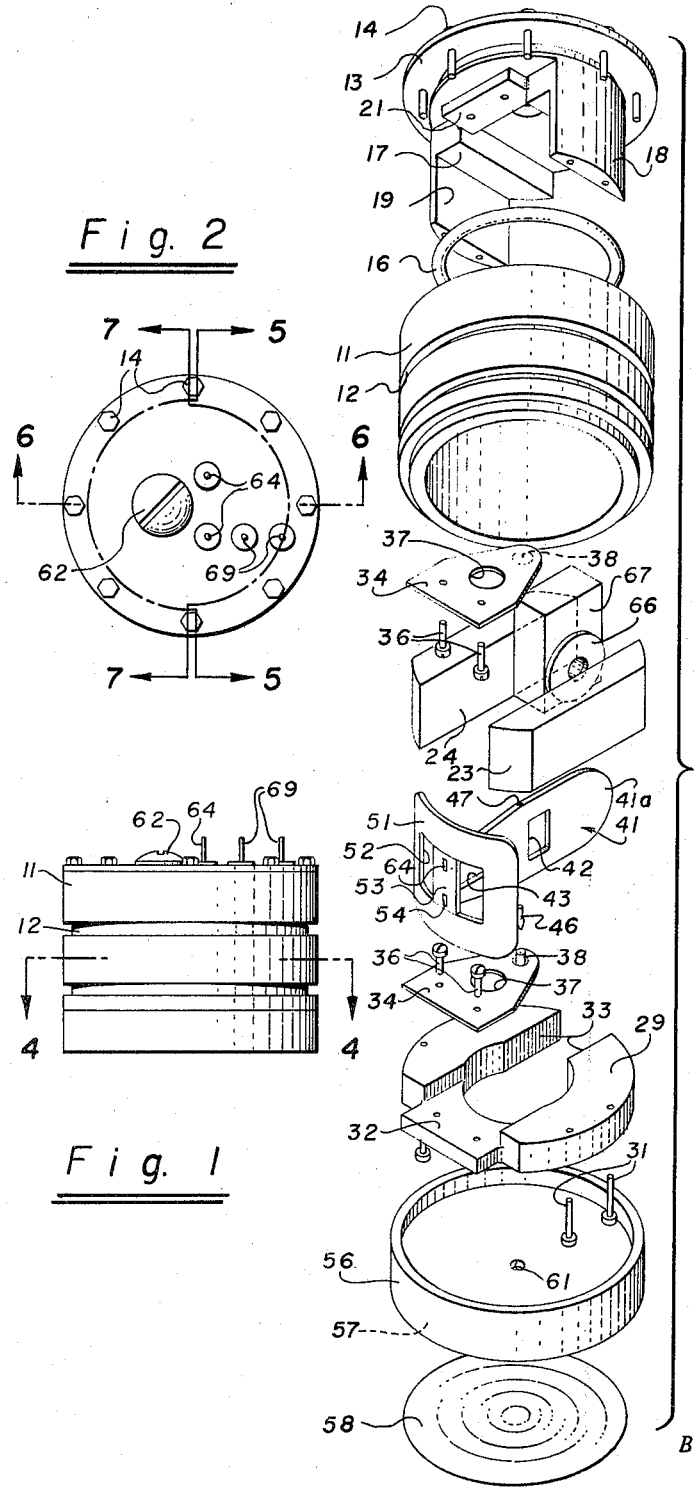
INVENTOR.
Donald E. Clark
BY Flehr and Swain
Attorneys April 19, 1966 D. E. CLARK 3,246,525
SENSING ASSEMBLY FOR LINEAR SERVO ACCELEROMETER
Original Filed July 3, 1961 2 Sheets-Sheet 2

INVENTOR.
Donald E. Clark
BY
Attorneys

United States Patent Office 3,246,525
Patented Apr. 19, 1966

3,246,525
SENSING ASSEMBLY FOR LINEAR SERVO
ACCELEROMETER
Donald E. Clark, Los Altos, Calif., assignor to Systron-Donner Corporation, Concord, Calif., a corporation of California
Continuation of application Ser. No. 121,755, July 3, 1961. This application Sept. 26, 1963, Ser. No. 311,767
13 Claims. (Cl. 73—517)

This application is a continuation of my application Serial No. 121,755, filed July 3, 1961, now abandoned.

This invention relates to a sensing assembly for servo accelerometers and more particularly to a sensing assembly for linear servo accelerometers.

Heretofore, the sensing mechanisms for certain linear accelerometers have had structural weaknesses so that certain parts of the accelerometer have had a tendency to vibrate or become resonant at certain frequencies. In addition, such sensing assemblies have been difficult to manufacture and assemble, therefore making them relatively costly. There is, therefore, a need for a new and improved sensing assembly for linear servo accelerometers.

In general, it is an object of the present invention to provide a sensing assembly for linear servo accelerometers which is very strong structurally.

Another object of the invention is to provide a sensing assembly of the above character which can be readily manufactured and assembled.

Another object of the invention is to provide a sensing assembly in which the outer housing of the sensing assembly forms a part of the magnetic path.

Another object of the invention is to provide a sensing assembly of the above character in which a cantilevered support system is provided for the bearings.

Another object of the invention is to provide a sensing assembly of the above character in which the friction provided during shock and vibration can be controlled while at the same time permitting freedom of movement of the moving parts of the sensing assembly.

Another object of the invention is to provide a sensing assembly of the above character in which it is possible to provide different resonant frequencies for the cantilevered supports so that vibration effects can be minimized.

Another object of the invention is to provide a sensing assembly of the above character in which the cantilevered supports allow great flexibility to provide the proper spring stiffness.

Another object of the invention is to provide a sensing assembly of the above character in which the paddle utilized is formed of one solid piece.

Another object of the invention is to provide a sensing assembly of the above character in which the paddle is supported in such a manner to give great mechanical rigidity.

Another object of the invention is to provide a sensing assembly of the above character in which the paddle is less susceptible to vibration.

Additional objects and features of the invention will appear from the following description in which preferred embodiments are set forth in detail in conjunction with the accompanying drawings.

Referring to the drawings:

FIGURE 1 is a side elevational view of a sensing assembly for a linear accelerometer incorporating my invention.

FIGURE 2 is a top plan view of the sensing assembly shown in FIGURE 1.

FIGURE 3 is an exploded view of the sensing assembly shown in FIGURE 1 showing the various parts.

Figure 4:
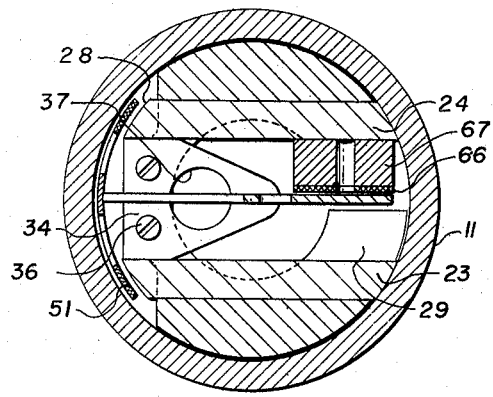
FIGURE 4 is a cross-sectional view taken along the line 4—4 of FIGURE 1 showing my sensing assembly.
Figure 5:
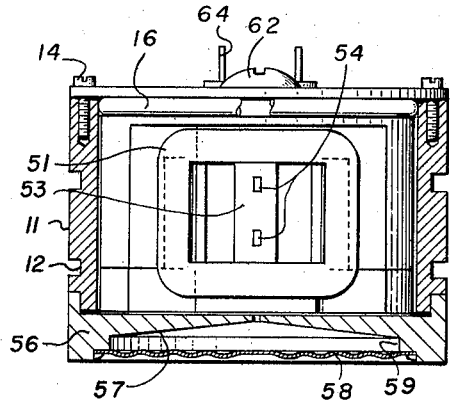
FIGURE 5 is a cross-sectional view taken along the line 5—5 of FIGURE 2.
Figure 6:
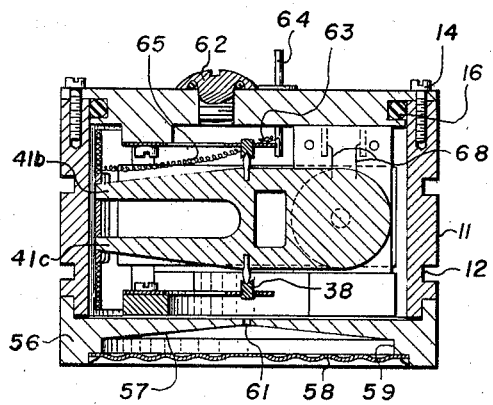
FIGURE 6 is a cross-sectional view taken along the line 6—6 of FIGURE 2.
Figure 7:
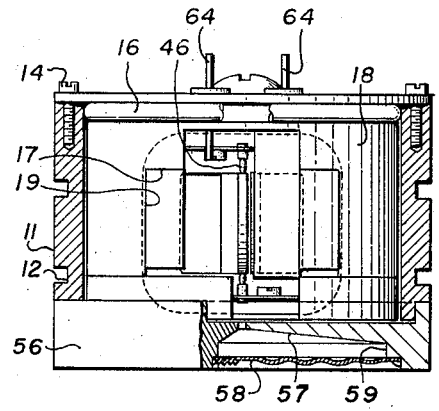
FIGURE 7 is a cross-sectional view taken along the line 7—7 of FIGURE 2.

In general, my sensing assembly for linear servo accelerometers consists of a body which is provided with a pair of cantilevered supports. A conducting planar element is pivotally mounted in the cantilevered supports and carries a coil. A magnet is disposed adjacent the coil and the body so that the magnetic path passes through a portion of the body and about the coil. Pickoff means is disposed adjacent the planar element and is mounted within the body.

More in particular, as shown in the drawings, my sensing assembly for a linear servo accelerometer consists of a cylindrical case or housing 11 which is provided with a pair of external annular grooves 12 which are utilized for securing the sensing assembly in an accelerometer by suitable means such as retaining rings. It is, however, apparent if desired the sensing assembly could be fastened to any suitable location with interconnecting leads to the accelerometer.

An end plug 13 is mounted in one end of the open-ended cylindrical case 11 and is adapted to be secured to the case 11 by suitable means such as screws 14. An O-ring 16 is provided between the plug and the case for establishing a fluid-tight seal between the end plug 13 and the case 11.

The end plug 13 is formed in such a manner that it is provided with a pair of spaced shoulders 17 which lie substantially in the same plane. The end plug is also formed with extensions 18 which extend into the case 11 and which are formed to provide flat shoulders 19 lying in a plane at right angles to the plane of the shoulders 17. The end plug is also provided with a supporting block 21 which lies between the shoulders 17.

A pair of bar magnets 23 and 24 are mounted upon the shoulders 17 adjacent the shoulders 19 by suitable means such as by solder so that they form chords with respect to the case 11. The magnets are formed with straight sides and are provided with arcuate ends which conform to the contour of the inner wall of the casing 11 as shown particularly in FIGURE 4. The length of each of the magnets 23 and 24 is such that it is slightly less than the length of a corresponding chord extending across the case. The magnets 23 and 24 are mounted in such a manner that one pole of each of the magnets abuts the inner wall of the casing 11, whereas the opposite pole is spaced from the inner wall of the casing 11 to provide spaces 28 between the magnets and the inner wall of the casing 11.

A split support ring 29 is mounted within the casing and is fixed to the extensions 18 of the end plug by suitable means such as screws 31. The support ring 29 is provided with a supporting block 32 intermediate the ends of the split support ring which is opposite the supporting block 21 provided on the end plug 13. The split support ring 29 is also provided with an opening 33 between its ends for a purpose hereinafter described.

A pair of cantilevered supports are mounted on the supporting blocks 21 and 32. Each consists of a spring member 34 of suitable material such as beryllium copper or phosphor bronze which is secured to the supporting blocks 21 and 32 by suitable means such as screws 36. As can be seen particularly from FIGURES 3 and 4, the spring members 34 have a generally triangular shape and are provided with a centrally located hole 37. A bearing 38 is mounted in the outer end of each of the spring members 34.

A paddle and coil assembly is pivotally mounted in the cantilevered support and consists of a pendulous paddle member 41 formed of a suitable conducting material such as aluminum which is provided with a centrally located hole 42 to reduce the weight and an open-ended slot 43 at one end of the paddle member. The paddle member is flat and straight and lies in one plane as shown. The paddle member 41 is pivotally supported in the bearings 38 by pivot pins 46 which are fixed in holes 47 provided in the paddle member. The pivot pins 46 are fixed to the paddle in such a manner that they form an integral part of the paddle and provide a relatively rigid support for the paddle member. One end 41a of the paddle member serves as a conducting planar element for a purpose hereinafter described, whereas the other end of the paddle member serves as a support for a coil 51.

The coil 51 is formed of a number of turns of wire in such a manner that it is in the form of a pancake type coil provided with a central opening 52. The coil is formed in such a manner that it has an arcuate shape which has a radius which is slightly less than the radius of the inner surface of the casing 11 as shown particularly in FIGURE 4. The thickness of the coil is such that it it can move freely in the spaces 28 provided between the magnets and the inner wall of the casing 11. The coil 51 is secured to the paddle member 41 by a support block 53 which is mounted in the opening 52 and bonded to the coil by suitable means such as an epoxy resin. The support plate 53 is provided with openings 54 which can receive the leg-like portions 41b and 41c of the other end of the paddle member 41. The ends 41b and 41c, after they have been placed in the holes 54, are swaged to securely lock the support plate to the paddle member. In addition, if desired, an epoxy fillet can be placed between the portions 41b and 41c and the plate member 53 to provide additional mechanical rigidity between the coil and the paddle member 41.

The other end of the case 11 is adapted to be closed by a cover 56 and is secured to the casing 11 by suitable means such as soldering or brazing. The cover 56 is supplied with a tapered recess 57. A diaphragm 58 is soldered in place over the recess 57 to provide an enclosed space 59 between the diaphragm and the recess 57 of the cover. An opening 61 is provided in the cover. The entire assembly is normally filled with oil through the cap 62 provided in the end plug 13 for reasons well known to those skilled in the art. As the oil expands because of temperature changes, the oil can bleed through the opening 61 into the chamber 58. The small opening 61 prevents the oil from sloshing about within the casing 11.

A pair of leads 63 from the coil 51 are connected to a pair of terminals 64 mounted in the end plug 13. It will be noted that the leads 63 are provided with a plurality of small loops 65 so that the leads will offer the least possible restraint to the movement of the paddle assembly as hereinafter described.

A pickoff coil 66 is mounted within the casing and consists of a plurality of turns of wire wound into a pancake type coil and mounted upon a block 67 of suitable insulating materials such as glass filled epoxy. The block is secured to one end of the magnet adjacent the end 41a of the paddle member 41 by suitable means such as an epoxy resin, so that the pickoff coil 66 lies in a plane substantially parallel to the plane of the end 41a of the paddle member 41. As is well known to those skilled in the art, the pickoff coil can consist of one coil or a pair of coils. If a pair of coils are utilized, the coils are normally wound concentrically. The leads 68 from the pickoff coil are connected to terminals 69 provided in the end plug.

Operation and use of my sensing assembly may now be briefly described as follows: As is well known to those well skilled in the art, my sensing assembly is particuarly adapted for use in a linear servo accelerometer and in such an environment is normally connected to electronics. This electronics includes an oscillator which is connected to the pickoff coil, a detector which rectifies the output of the oscillator, and an amplifier which amplifies the output of the detector. A certain portion of the output from the output amplifier is fed back to the moving coil 51 to apply a restoring force to the paddle member 41 to return the paddle member to its midpoint position or to maintain the paddle member 41 in its midpoint position between the pair of magnets. An automatic balance is, therefore, established between the input forces provided by the coil 51 and the force of acceleration on the paddle member 41.

The sensing assembly is normally positioned in such a manner that it can sense linear acceleration, that is, with the force of acceleration at right angles to the plane of the paddle member 41. With a change in acceleration, the planar conducting element 41a will move toward or away from the pickoff coil 66 about an axis which is coincident with the axis of the cylindrical casing 11. This causes a change in the current flow in the pickoff coil which causes a change in the output of the oscillator. This change in the output is detected and amplified, and fed back to the moving coil 51 to reduce or increase the restoring force applied by the coil 51. As pointed out previously, the conducting planar element 41a is positioned in a field provided by the two magnets 23 and 24 so that a restoring force is applied to the conducting planar element 41a in a direction which is directly opposite to the force of the acceleration or deceleration.

The sensing assembly, as shown, is particularly useful in linear servo accelerometers because of several important features. The construction is simplified because a part of the casing 11 forms a part of the magnetic path. The magnetic lines of force from each of the magnets 23 and 24 pass through the air gap 28 to the casing 11 after which they travel around the casing to the other end of the same magnet. After the magnetic lines of force have crossed the air gap 28, they have a relatively easy metallic path to follow to the other pole of the magnet because the other pole of the magnet is in direct contact with the casing as can be seen particularly from FIGURE 4. A greater number of lines of magnetic force travel this path rather than through the path to the opposite pole of the other magnet because of the additional air gap 28 in the path. The use of the casing 11 as a part of the path for the magnetic lines of force greatly simplifies the construction of the device and at the same time increases the magnetic forces available with a magnet having a predetermined strength.

The cantilevered supports provided for pivotally mounting the paddle and coil assembly have several distinct advantages. For example, it has been found that with such cantilevered supports in the form of the spring members 34, it is possible to control the preload forces which are applied at the bearings for the paddle and coil assembly within relatively close limits during the time severe shock forces or vibration are being applied to the sensing assembly. This is true because if a force is suddenly applied in a direction which is perpendicular to the planes of the spring members 34, both of the spring members will move in the direction which is opposite to the direction of the force applied to maintain relatively constant contact pressures on the pivot pins 46 for the paddle and coil assembly. Thus, when shock forces are applied, the pivot supports actually move with the paddle and coil assembly.

It also has been found that with such cantilevered supports, it is possible to readily vary the spring stiffness of the spring members 34 so that any desired degree of contact pressure can be applied to the pivot pins. This can be accomplished by increasing the thickness of the spring members 34, increasing or decreasing the size of the holes 37, or changing the material used without changing the geometry. The spring stiffness of one of the spring members 34 with respect to the others can be changed in this manner so that each has a resonant frequency which is different from that of the other. This makes it possible to avoid vibration amplification or, in other words, makes it possible to minimize the vibration effects.

The paddle design is such that it has a great deal of mechanical rigidity which aids measurably in resistance to vibration. The pivot pins are mounted in machined holes provided in the paddle member and, therefore, give the effect of a straight shaft connected between the two bearings 38 mounted in the cantilevered supports. The paddle member itself is straight without any bends. It is believed that this strengthens the paddle member and tends to prevent the vibration of one portion of the paddle member with respect to another portion of the paddle member.

In addition to the above advantages, the construction shown is such that all the parts can be readily machined or fabricated with very little difficulty. The parts can be readily assembled and adjusted.

It is apparent from the foregoing that I have provided a new and improved sensing assembly which is particularly adaptable for use in linear servo accelerometers. The construction is such that it can be made relatively compact without difficulty.

I claim:

1. In a sensing assembly for a linear servo accelerometer, a cylindrical housing, a pair of spaced cantilevered supports carried in said housing, a pendulous member pivotally mounted between and supported by said cantilevered supports in said housing, a conducting planar element affixed to one end of the pendulous member, a coil mounted on the other end of said pendulous member, a magnet mounted adjacent the coil and providing a magnetic field in which the coil is disposed, and pickoff means disposed adjacent the planar element, said pendulous member moving about a center point which is coincident with the axis of the housing, said coil being arcuate in form with the center of the arc being coincident with the axis of the housing.

2. In a sensing assembly for a linear servo accelerometer, a cylindrical housing, a pendulous member pivotally mounted in said housing, a conducting planar element affixed to one end of said member, a coil mounted on said member, a pair of magnets mounted in said housing and having one end of each of the same substantially abutting the housing and having the other end of each of the magnets spaced from the housing to form air gaps between the magnets and the housing, the magnets being spaced apart so that a substantially greater number of magnetic lines of force travel through said air gap and the housing than directly between the magnets, the coil being disposed in the air gaps and being adapted to move in the air gaps, and pickoff means disposed adjacent the planar element, the pivot axis for the pendulous member being coincident with the axis of the housing, said coil being in the form of an arc concentric with the housing.

3. A sensing assembly as in claim 2 wherein said pendulous member is carried on cantilevered supports mounted in the housing, said cantilevered supports being in the form of spring members disposed on opposite sides of the pendulous member.

4. In a sensing assembly for a linear servo accelerometer, a cylindrical casing, a pair of supporting members fixed to said casing, a pair of cantilevered spring members fixed to said support members, a paddle member pivotally mounted between and supported by said spring members so that its axis of pivot is coincident with the axis of the casing, a planar conducting element mounted on one end of said paddle member, an arcuately-shaped coil concentric with the casing mounted on the other end of said paddle member and lying generally in a plane at right angles to the conducting planar element, a pair of magnets mounted in said casing in a direction generally parallel to the normal position of said paddle member, one end of each of the magnets being adjacent the casing and the other end of each of the magnets being spaced from the casing to provide a space between it and the casing in which the coil may travel, and pickoff means disposed adjacent the planar element.

5. A sensing assembly as in claim 4 wherein said paddle member and said conducting planar element are an integral piece of conducting material lying in a single plane.

6. A sensing assembly as in claim 5 wherein said paddle member is pivotally supported in said cantilevered spring members by a pair of pivot pins fixed to the paddle member and extending from the paddle member in the same plane as the paddle member.

7. A sensing assembly as in claim 4 wherein said magnets are bar magnets and lie in planes which define chords on the cylindrical casing.

8. A sensing assembly as in claim 7 wherein said magnets are provided with arcuate ends which conform to the contour of the inner surface of the cylindrical casing.

9. A sensing assembly as in claim 5 wherein said cantilevered spring members are generally triangular in shape and have a centrally disposed opening therein.

10. In a sensing assembly for a linear servo accelerometer, a housing, a pair of spaced compliant cantilevered supports mounted upon said housing, said compliant cantilevered supports being substantially triangular in shape and having apex and base portions, a pendulous member pivotally mounted between the cantilevered supports at points adjacent to the apex portions of the triangular supports for movement on a pivot axis, the base portions of the cantilevered supports being rigidly secured to the housing, a conducting planar element affixed to one end of the pendulous member, a coil mounted on said pendulous member, a magnet disposed adjacent the coil and providing a magnetic field, portions of said coil being disposed in the magnetic field, and pickoff means disposed adjacent the planar element.

11. In a sensing assembly for a linear servo accelerometer, a housing, a pair of spring-like members, said spring-like members being substantially triangular with apex and base portions, the base portions of the spring-like members being rigidly secured to the housing so that the spring-like members are disposed in a spaced, substantially parallel relationship facing each other, a bearing mounted on each of said spring-like members adjacent the apex portion of the spring-like member, a pendulous member pivotally mounted in said bearings for pivotal movement about a pivot axis, said spring-like members forming cantilevered supports for said pendulous member, said spring-like members permitting movement of the pendulous member in a direction parallel to the pivot axis, a conducting planar element affixed to one end of said pendulous member, a coil mounted on said pendulous member, a magnet disposed adjacent the coil and providing a magnetic field, a portion of the coil being disposed in the magnetic field, and pickoff means disposed adjacent the planar element.

12. In a sensing assembly for a linear servo accelerometer, a housing, a pair of planar spaced-apart spring-like members, said spring-like members being substantially triangular with base and apex portions, the base portions of the spring-like members being rigidly secured to said housing to provide cantilevered supports having apex portions which are free to move, a pendulous member, means for pivotally mounting the pendulous member between said spring-like members to permit movement of the pendulous member about a pivot axis substantially perpendicular to the planar spring-like members, said means for pivotally mounting the pendulous member consisting of bearing means mounted on the spring-like members adjacent the apex portions, and pivot pins mounted in the pendulous member and engaging said bearing means on the spring-like members, said spring-like members permitting movement of the pendulous member in a direction along the pivot axis, a conducting planar element affixed to one end of the pendulous member, a coil mounted on said pendulous member for movement with the pendulous member, a magnet disposed adjacent the coil and providing a magnetic field, at least a portion of the coil being disposed in the magnetic field, and pickoff means disposed adjacent the planar element.

13. A sensing assembly as in claim 12 wherein said triangular spring-like members have relatively large holes centrally positioned therein to reduce the mass of the spring-like members.

References Cited by the Examiner

UNITED STATES PATENTS

| | | | |
|---|---|---|---|
| 2,427,529 | 9/1947 | Hickok et al. | 324—155 |
| 2,633,544 | 3/1953 | Herr | 308—159 |
| 2,734,736 | 2/1956 | Payne | 73—398 |
| 2,802,956 | 8/1957 | Jarosh et al. | 73—516 |
| 2,901,298 | 8/1959 | Carpenter | 308—159 |
| 2,985,021 | 5/1961 | Lewis et al. | 73—517 |
| 3,074,279 | 1/1963 | Morris | 73/517 |

RICHARD C. QUEISSER, *Primary Examiner.*

JAMES J. GILL, *Examiner.*